Figure 1:
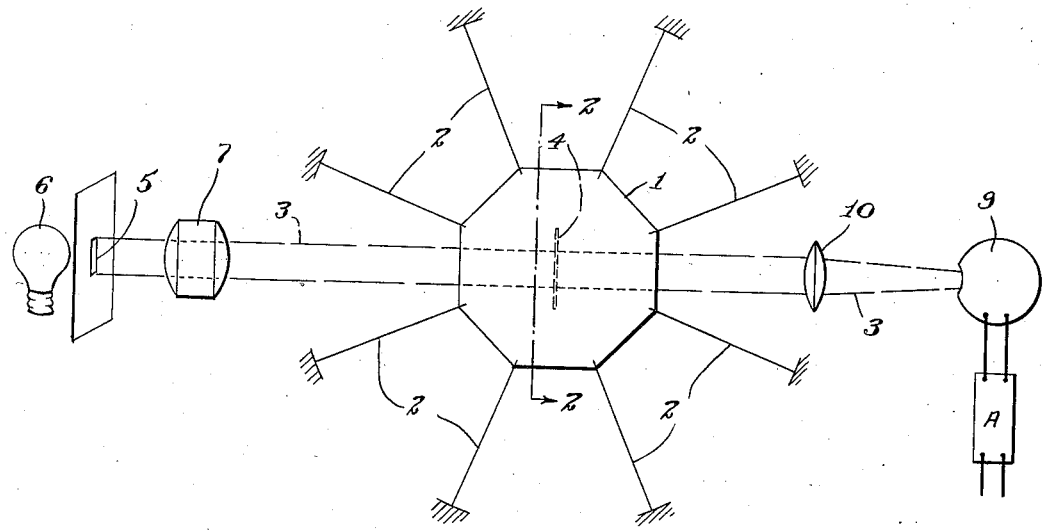

Sept. 10, 1935.  E. L. BOWLES  2,014,193
ACOUSTIC ELECTRIC ENERGY CONVERTER AND METHOD
Filed Sept. 11, 1929

Inventor
Edward L. Bowles
by David Ruis
Attorney

Patented Sept. 10, 1935

2,014,193

UNITED STATES PATENT OFFICE 2,014,193

ACOUSTIC-ELECTRIC-ENERGY-CONVERTER AND METHOD

Edward Lindley Bowles, Wellesley Farms, Mass.

Application September 11, 1929, Serial No. 391,836

8 Claims. (Cl. 179—121)

The present invention, though having fields of more general usefulness, is more particularly related to devices for and method of converting or translating acoustic into electric energy.

Transmitters or microphones, as used at the present time in the communication art, commonly employ metal membranes or diaphragms that are clamped along their peripheries. In one such device, a cup or button of carbon granules is held against the face of the diaphragm. The vibration of the diaphragm causes variation in the resistance of the carbon particles and this, in turn, varies an electric current. Aside from the fact that the resistance variation is non-linear, the device is too massive to permit sensitiveness; so that the transmission is not faithfully reproduced, because of the very fact of the presence of the device in the sound field. The condenser transmitter, another common translating device, has a fixed conducting surface disposed exceedingly close and parallel to a metal diaphragm. Vibrations in the diaphragm cause variations in the distance and, therefore, the capacitance, between the two conducting elements, and the variations in capacitance is made use of to modulate a current, which may then be amplified. The metal diaphragm must, however, be stretched very tightly if it is not to affect seriously the translation of the acoustic wave, and the actual acoustic impedance of the diaphragm is, furthermore, a function of the electric circuit that is coupled to the diaphragm. Both these devices, as employed up to the present time, are massive enough to disturb the sound field and its boundary conditions, and thus affect the measurements to such an extent that it is generally impossible to tell what the conditions of the sound field would have been in the absence of these devices. This is particularly serious when the region of the sound field,—say, of a loud-speaker horn,—is so small that the said devices are large in comparison therewith.

An object of the present invention is to provide a very sensitive converter of energy of the above-described character that shall translate, with greater fidelity than is possible with present-day electro-dynamic methods, acoustic into electric energy. To this end, a feature of the invention contemplates the use of a sound-wave detecting instrument having a small portion adapted to be positioned in a correspondingly small portion of a sound field, the small portion being provided with a very light-moving membrane or diaphragm. The sound waves of the sound field impinge upon the membrane to vibrate the membrane in the said small portion of the sound field. The said small portion of the device is of small enough dimensions, and the device is sufficiently free of obstructions in front of and on all sides of the said small portion of the device in a plane substantially normal to the direction of the impinging sound wave, and the membrane is of sufficient thinness and lightness and of small enough dimensions so that the acoustic reaction of the said small portion of the instrument on the sound field is sufficiently negligible to prevent substantial distortion of the said small portion of the sound field by the said small portion of the instrument. As a result of this construction, the membrane, during its vibration by the sound wave in the sound field, will follow faithfully the instantaneous variations in velocity of the air particles of the said small portion of the sound field, without substantial alteration of the said variations from what the said variations would have been in the absence of the said small portion of the device. The system, furthermore, embodies, in its preferred form, the use of a light beam that in no way imposes any acoustic load upon the membrane or diaphragm. Any other suitable means controlled by the vibration of the membrane may, however, be employed for detecting the vibration of the membrane, or for translating the instantaneous movements of the membrane into corresponding values of electric current.

A further object of the invention is to provide a novel method of detecting a sound wave in a sound field.

Figure 2:
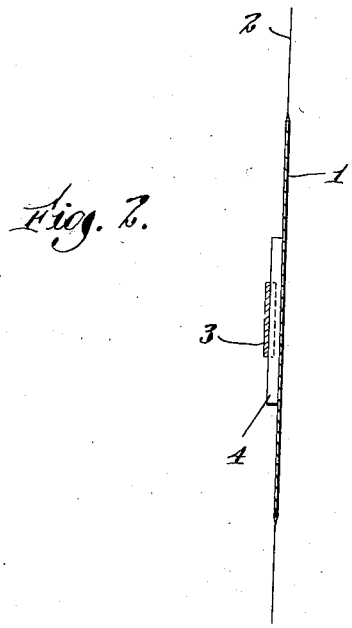

Other objects will be explained hereinafter, and will be more particularly pointed out in the appended claims. The invention will now be explained in connection with the accompanying drawing, in which Fig. 1 is a perspective diagrammatic view illustrating the invention in its preferred form, and Fig. 2 is a section taken upon the line 2—2 of Fig. 1, looking in the direction of the arrows.

A substantially weight-less membrane 1 is suspended in the said small portion of the said field by a series of silk or other very light fibres 2 that are attached to the periphery of the membrane. So mounted, the membrane, being of the dimensions and weight before described, and since the small portion of the device that carries it is sufficiently free of obstructions in front of and on all sides of the said small portion in a direction substantially normal to the direction of the sound wave, will vibrate freely in reciprocative fashion, like a piston. The less the mass of the membrane, the more closely will its movement approach that of a true piston. Indeed, if the membrane could be made ideally weightless, it would move exactly in unison with the surrounding air, and would exactly follow the vibrations of the air particles in the sound field during the transmission of a sound wave. Its own identity would then be lost in the operation, and it would introduce no discontinuity in the path of the compressional wave. This ideal arrangement can be approached, in practice, by making the membrane sufficiently weight-less; as before stated, and under the conditions before described, substantial distortion of the said small portion of the sound field will then be prevented. The mechanical characteristics of the membrane are completely determined by its inertia and by the elastic forces and the inertia of the suspending fibres 2. The system can, therefore, be made exceedingly light; and it can, therefore, be enabled to follow vibrations of very high frequencies as well as vibrations of low frequencies. Its own natural frequency, indeed, may be made so high or so low that it comes nowhere in the region of the ordinary band of frequencies involved in the voice or music spectrum.

To cause the movements of the diaphragm to produce electric-energy variations that are facsimiles of, or proportional to, the amplitude of vibration of the membrane at any instant, a light beam 3 is caused to traverse a path at right angles to the path of vibration of the membrane, and to impinge upon a barrier or vane 4, so as to become partly occulted thereby. The vane 4 is fixed to the membrane 1 so as to vibrate therewith. During such vibration, therefore, the vane varies the effective cross-sectional area of the light beam, the non-occulted portion of the light beam traveling to a photo-electric or other light-sensitive cell 9.

The light beam may be produced in any desired manner, but is illustrated as coming through a rectangular, vertically disposed slit 5, from a light source 6. The slit is focussed on the vane 4, in a plane normal to the plane of the membrane, by a lens system 7. The light beam is so focussed as to direction and position on the vane 4 that its cross section is partly covered by the vane 4, as illustrated more particularly in Fig. 2.

When the membrane is quiescent, a predetermined, fractional part of the total cross-sectional area of the light beam continues on beyond the vane 4 towards the cell 9. A converging lens 10 may be used to cause the light continuing beyond the barrier 4 to be concentrated on a region of the cell 9. During the vibration of the membrane in a direction normal to its plane, however, the occulting vane 4 will vary the effective cross-sectional area of the light beam, and the non-occulted portion of the light beam that impinges upon the cell will vary correspondingly.

If the current in the cell is proportional to the intensity of illumination of the cell, the cell current will vary in proportion as the membrane vibrates back and forth. The instantaneous movement of the membrane is thus translated into instantaneous values of current. A comparison of the conditions at a point in the sound field with the source of sound is thus reduced to a comparison of electrical quantities. The currents may be amplified by an amplifier 9.

In accordance with the present invention, therefore, it is possible to remove energy from the system, sufficient to operate the instrument, so as to enable the sound to be measured quantitatively, yet sufficiently minute, compared to the total energy passing through or past the instrument, as to be insufficient to disturb appreciably the remainder of the system.

It will be understood that the invention is not restricted to the illustrated embodiment thereof, but is susceptible to modification and change within the skill of the artisan, and all such modifications and changes are considered to fall within the spirit and scope of the invention, as defined in the appended claims.

What is claimed is:

1. Apparatus of the character described comprising, in combination, a reciprocative membrane, an occulting vane carried thereby so as to reciprocate therewith, means for projecting a beam of light so as to cause it to intersect the path of reciprocation of the vane, and a light-sensitive cell for receiving so much of the light as is not occulted by the vane.

2. Apparatus of the character described comprising, in combination, a substantially weightless membrane, a plurality of fibres supporting the same so as to render it reciprocative, an occulting vane carried by the membrane so as to reciprocate therewith, means for projecting a beam of light so as to cause it to intersect the path of reciprocation of the vane, and a light-sensitive cell for receiving so much of the light as is not occulted by the vane.

3. Apparatus of the character described comprising, in combination, a membrance suspended so that it may act like a piston, an occulting vane carried by the membrane so as to move therewith, means for projecting a beam of light substantially rectangular in cross section, means for focusing the light upon the vane, a light-sensitive cell to which the light not occulted by the vane travels, and means for amplifying the effect produced by the light upon the cell.

4. Apparatus for converting acoustic energy into electric energy comprising, in combination, a membrane free to vibrate as a piston, an occulting vane carried by the membrane so as to vibrate therewith, means for projecting a beam of light in a direction perpendicular to the path of vibration of the vane so as to cause it to impinge upon the vane and become partly occulted thereby, and a light-sensitive cell upon which the non-occulted portion of the beam impinges, whereby acoustic energy acting upon the membrane is converted into electric energy in the light-sensitive cell.

5. Apparatus for converting acoustic energy into electric energy comprising, in combination, a membrane so suspended from points along its periphery as to render it free to vibrate as a piston, an occulting vane fixed to the surface of the membrane so as to vibrate therewith in a direction normal to the membrane, means for projecting a beam of light substantially rectangular in cross section in a direction perpendicular to the path of vibration of the vane so as to cause it to impinge upon the vane and become partly occulted thereby, and a light-sensitive cell upon which the non-occulted portion of the beam impinges, whereby acoustic energy acting upon the membrane is converted into electric energy in the light-sensitive cell.

6. A sound-wave detecting instrument having, in combination, a device having a small portion provided with a membrane, the small portion being adapted to be positioned in a correspondingly small portion of a sound field having a sound wave that impinges upon the membrane to vibrate the membrane in the said small portion of the sound field, the said small portion of the device being of small enough dimensions and the device being sufficiently free of obstructions in front of and on all sides of the said small portion thereof in a plane substantially normal to the direction of the sound wave and the membrane being of sufficient thinness and lightness and of small enough dimensions so that the acoustic reaction of the said small portion of the device on the sound field is sufficiently negligible to prevent substantial distortion of the said small portion of the sound field by the said small portion of the device, whereby the membrane, during its vibration by the sound wave in the sound field, will follow faithfully the instantaneous sound variations of the said small portion of the sound field without substantial alteration of the said variations from what the said variations would have been in the absence of the said small portion of the device, and means controlled by the vibration of the membrane for detecting the vibration of the membrane.

7. A sound-wave detecting instrument having, in combination, a device having a small portion provided with a membrane, the small portion being adapted to be positioned in a correspondingly small portion of a sound field having a sound wave that impinges upon the membrane to vibrate the membrane in the said small portion of the sound field, the said small portion of the device being of small enough dimensions and the device being sufficiently free of obstructions in front of and on all sides of the said small portion thereof in a plane substantially normal to the direction of the sound wave and the membrane being of sufficient thinness and lightness and of small enough dimensions so that the acoustic reaction of the said small portion of the device on the sound field is sufficiently negligible to prevent substantial distortion of the said small portion of the sound field by the said small portion of the device, whereby the membrane, during its vibration by the sound wave in the sound field, will follow faithfully the instantaneous sound variations of the said small portion of the sound field without substantial alteration of the said variations from what the said variations would have been in the absence of the said small portion of the device, and means controlled by the vibration of the membrane for translating the instantaneous movements of the membrane into corresponding values of electric current.

8. A method of detecting a sound wave in a sound field, comprising positioning in a small portion of the sound field a correspondingly small membrane-containing portion of a device the membrane of which is adapted to be vibrated in the said small portion of the sound field by impingement of the sound wave upon the membrane, maintaining the device sufficiently free of obstructions in front of and on all sides of the said small portion thereof in a plane substantially normal to the direction of the sound wave and the said small portion of the device being of small enough dimensions and the membrane being of sufficient thinness and lightness and of small enough dimensions so that the acoustic reaction of the said small portion of the device on the sound field is sufficiently negligible to prevent substantial distortion of the said small portion of the sound field by the said small portion of the device, whereby the membrane, during its vibration by the sound wave in the sound field, will follow faithfully the instantaneous sound variations of the said small portion of the sound field without substantial alteration of the said variations from what the said variations would have been in the absence of the said small portion of the device, and detecting the vibration of the membrane.

EDWARD L. BOWLES.